(12) United States Patent
Sato et al.

(10) Patent No.: US 11,709,899 B2
(45) Date of Patent: Jul. 25, 2023

(54) TRAINING DATA COLLECTION SYSTEM, SIMILARITY SCORE CALCULATION SYSTEM, DOCUMENT RETRIEVAL SYSTEM, AND NON-TRANSITORY COMPUTER READABLE RECORDING MEDIUM STORING TRAINING DATA COLLECTION PROGRAM

(71) Applicant: KYOCERA Document Solutions Inc., Osaka (JP)

(72) Inventors: Koji Sato, Osaka (JP); Kanako Morimoto, Osaka (JP); Rui Hamabe, Osaka (JP); Kazunori Tanaka, Osaka (JP); Takuya Miyamoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/873,351

(22) Filed: Jul. 26, 2022

(65) Prior Publication Data

US 2023/0034012 A1    Feb. 2, 2023

(30) Foreign Application Priority Data

Jul. 29, 2021    (JP) .................................. 2021-123804

(51) Int. Cl.
*G06F 16/00*    (2019.01)
*G06F 16/93*    (2019.01)
*G06F 16/9038*    (2019.01)
*G06F 16/9035*    (2019.01)

(52) U.S. Cl.
CPC .......... *G06F 16/93* (2019.01); *G06F 16/9035* (2019.01); *G06F 16/9038* (2019.01)

(58) Field of Classification Search
CPC ...................................................... G06F 16/93
See application file for complete search history.

(56) References Cited

U.S. PATENT DOCUMENTS

2006/0265209 A1*  11/2006  Bradford ................. G06F 40/42
                                                                704/9

FOREIGN PATENT DOCUMENTS

JP        H11-53396        2/1999
JP        2018-124617      8/2018

* cited by examiner

*Primary Examiner* — Ajith Jacob
(74) *Attorney, Agent, or Firm* — Lex IP Meister, PLLC

(57) ABSTRACT

A vector generation unit derives a reference feature vector and a document feature vector. A feature quantity extraction unit performs a dimensionality reduction process on the reference feature vector and the document feature vector so as to set a dimensional value as a first feature quantity and derives a cosine similarity between the reference feature vector and the document feature vector as a second feature quantity. A grid division unit classifies documents into first partial regions obtained by dividing a feature quantity space of the first feature quantity, and classifies the documents into second partial regions obtained by dividing a range of the second feature quantity. A training data extraction unit selects, for each combination of a first partial region and a second partial region, a document classified in both the partial regions and sets documents selected with respect to all combinations as training data.

7 Claims, 3 Drawing Sheets

TRAINING DATA COLLECTION SYSTEM, SIMILARITY SCORE CALCULATION SYSTEM, DOCUMENT RETRIEVAL SYSTEM, AND NON-TRANSITORY COMPUTER READABLE RECORDING MEDIUM STORING TRAINING DATA COLLECTION PROGRAM

INCORPORATION BY REFERENCE

This application is based upon, and claims the benefit of priority from, corresponding Japanese Patent Application No. 2021-123804 filed in the Japan Patent Office on Jul. 29, 2021, the entire contents of which are incorporated herein by reference.

BACKGROUND

Field of the Invention

The present disclosure relates to a training data collection system, a similarity score calculation system, a document retrieval system, and a non-transitory computer readable recording medium storing a training data collection program.

Description of Related Art

Some document processing device derives a document vector of a target document, and derives a cosine value (cosine similarity) of the document vector as an indicator of similarity between documents.

During the collection of documents in a certain field as training data for machine learning, some training data collection device (a) derives feature vectors based on the number of occurrences of a word in reference data and collected data, respectively, (b) derives a cosine similarity between the feature vector of the reference data and the feature vector of the collected data, and (c) extracts, from pieces of collected data, a piece of collected data with a cosine similarity falling within a specific range as training data.

SUMMARY

A training data collection system according to the present disclosure includes a vector generation unit, a feature quantity extraction unit, a grid division unit, and a training data extraction unit. The vector generation unit derives a feature vector of a retrieval expression as a reference feature vector, and derives a feature vector of each of documents belonging to a population as a document feature vector. The feature quantity extraction unit (a) performs a dimensionality reduction process to reduce dimensionality of the reference feature vector and the document feature vector and sets a dimensional value obtained by the dimensionality reduction process performed on the reference feature vector and the document feature vector as a first feature quantity and (b) derives a cosine similarity between the reference feature vector and the document feature vector as a second feature quantity. The grid division unit classifies the documents into a first specific number of first partial regions obtained by dividing a feature quantity space of the first feature quantity, and classifies the documents into a second specific number of second partial regions obtained by dividing a range of the second feature quantity. The training data extraction unit (a) selects, for each combination of a first partial region and a second partial region, at least one document classified in both of the first partial region and the second partial region and (b) sets documents selected with respect to all combinations as training data.

A similarity score calculation system according to the present disclosure includes the training data collection system as above, a similarity score calculation unit that calculates similarity scores of the documents of the training data, and a machine learning processing unit that uses the training data to implement machine learning of the similarity score calculation unit.

A document retrieval system according to the present disclosure includes the similarity score calculation system as above, a retrieval condition input unit that designates the retrieval expression, and a retrieval result display unit that sorts the documents, which are extracted as the training data, in descending order of the similarity scores and displays a combination of the documents with the similarity scores of the documents on a display device.

In a non-transitory computer readable recording medium storing a training data collection program according to the present disclosure, the training data collection program causes a computer to serve as a vector generation unit, a feature quantity extraction unit, a grid division unit, and a training data extraction unit. The vector generation unit derives a feature vector of a retrieval expression as a reference feature vector, and derives a feature vector of each of documents belonging to a population as a document feature vector. The feature quantity extraction unit (a) performs a dimensionality reduction process to reduce dimensionality of the reference feature vector and the document feature vector and sets a dimensional value obtained by the dimensionality reduction process performed on the reference feature vector and the document feature vector as a first feature quantity and (b) derives a cosine similarity between the reference feature vector and the document feature vector as a second feature quantity. The grid division unit classifies the documents into a first specific number of first partial regions obtained by dividing a feature quantity space of the first feature quantity, and classifies the documents into a second specific number of second partial regions obtained by dividing a range of the second feature quantity. The training data extraction unit (a) selects, for each combination of a first partial region and a second partial region, at least one document classified in both of the first partial region and the second partial region and (b) sets documents selected with respect to all combinations as training data.

The above and other objects, features, and advantages of the present disclosure will be more evident from the detailed description below as well as the accompanying drawings.

DETAILED DESCRIPTION

In the following, an embodiment of the present disclosure is described based on the drawings.

Figure 1:
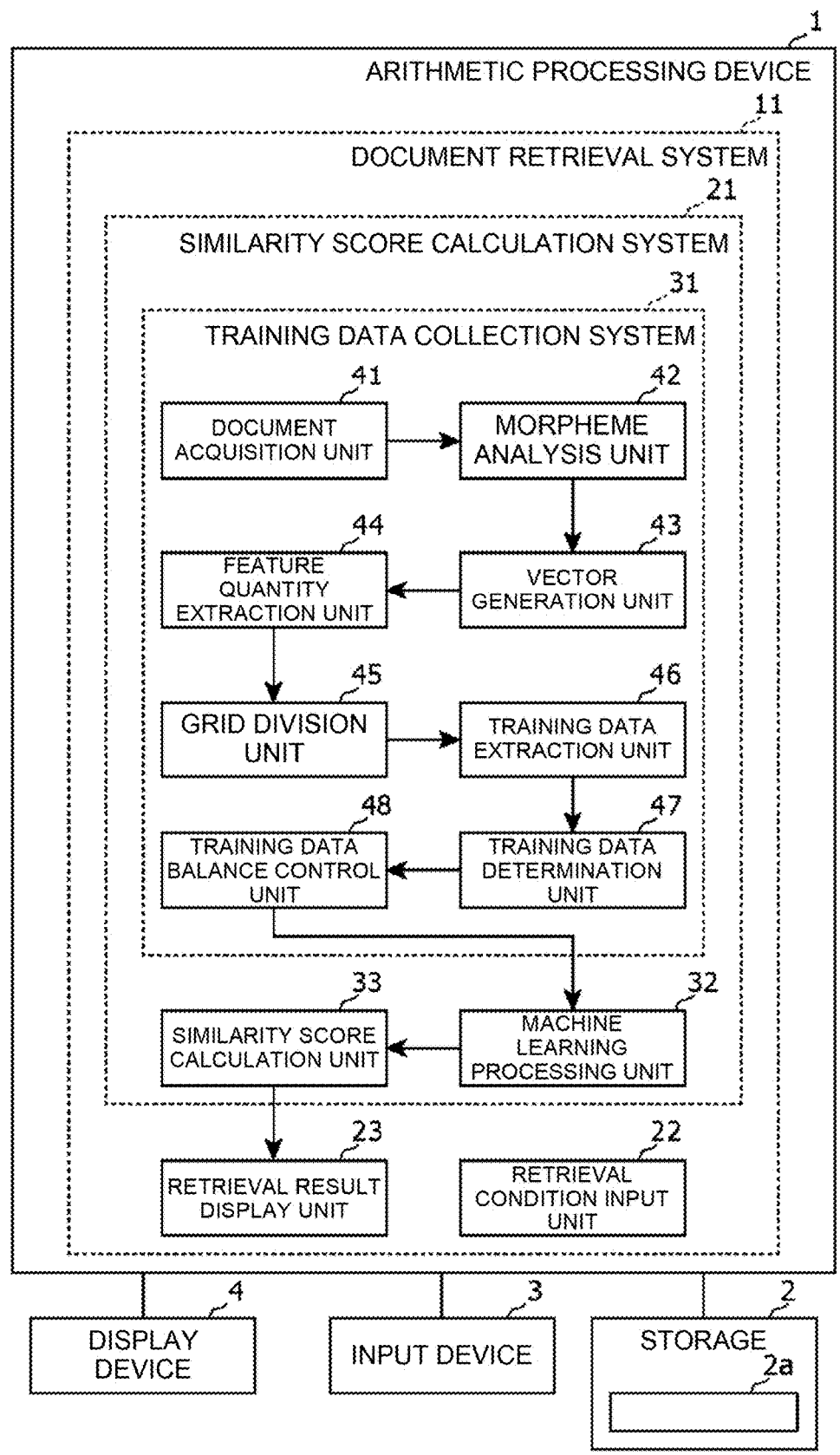
FIG. 1 is a block diagram illustrating a configuration of a document retrieval system according to an embodiment of the present disclosure.

FIG. 1 is a block diagram illustrating a configuration of a document retrieval system according to the embodiment of the present disclosure. The document retrieval system illustrated in FIG. 1 includes an arithmetic processing device 1 as a computer, a nonvolatile storage 2, an input device 3 to detect a user operation, and a display device 4 to display various kinds of information toward a user.

The arithmetic processing device 1 includes a central processing unit (CPU), a read-only memory (ROM), and a random access memory (RAM), loads programs stored in the ROM and the storage 2 into the RAM, and executes the programs with the CPU so as to serve as various processing units.

The arithmetic processing device 1 executes a document retrieval program 2a in the storage 2 so as to serve as a document retrieval system 11.

The document retrieval system 11 includes a similarity score calculation system 21, a retrieval condition input unit 22, and a retrieval result display unit 23.

The similarity score calculation system 21 includes a training data collection system 31, a machine learning processing unit 32, and a similarity score calculation unit 33.

The training data collection system 31 includes a document acquisition unit 41, a morpheme analysis unit 42, a vector generation unit 43, a feature quantity extraction unit 44, a grid division unit 45, a training data extraction unit 46, a training data determination unit 47, and a training data balance control unit 48.

The document acquisition unit 41 implements document retrieval with a retrieval expression designated by a user and acquires documents (document data) found by the document retrieval as a population. For instance, the document acquisition unit 41 uses a communications device not illustrated to access a server on a network, cause the server to perform the document retrieval, and acquire the population from the server so as to store the population in the storage 2 or the like.

The morpheme analysis unit 42 extracts a morpheme of the retrieval expression and a morpheme of each document belonging to the population with a known technique. Apart or parts of speech designated in advance (namely, nouns only, nouns and adjectives or the like) are designated as a morpheme.

The vector generation unit 43 derives a feature vector of the retrieval expression as a reference feature vector, and derives a feature vector of a document belonging to the population (hereinafter referred to as "population document") as a document feature vector. For instance, the vector generation unit 43 generates a feature vector of a morpheme in the retrieval expression and the population document and generates the feature vectors of the retrieval expression and the population document from the feature vector of the morpheme in the retrieval expression and the population document.

Feature vectors are derived by a count-based technique (such as a term frequency-inverse document frequency (TF-IDF) method) or a distributed representation technique (such as Word2vec and Bidirectional Encoder Representations from Transformers (BERT)), for instance. In the case of the count-based technique, a feature vector (of a document) is generated based on the number of occurrences of a word, while, in the distributed representation technique, the sum total or the mean value of feature vectors of words in a document is derived as a feature vector (of the document).

The feature quantity extraction unit 44 (a) performs a dimensionality reduction process to reduce dimensionality of the reference feature vector and the document feature vector and sets a dimensional value obtained by the dimensionality reduction process performed on the reference feature vector and the document feature vector as a first feature quantity and (b) derives a cosine similarity between the reference feature vector and the document feature vector as a second feature quantity.

The dimensionality reduction process is carried out by principal component analysis (PCA), singular value decomposition (SVD) or t-distributed stochastic neighbor embedding (t-SNE), for instance.

Values of the first feature quantity and the second feature quantity for the population document are associated with the population document and as such stored in the storage 2, for instance, and read by downstream processing units, such as the grid division unit 45 and the training data extraction unit 46, as required.

The grid division unit 45 classifies population documents into a first specific number (two or more, namely 16, for instance) of first partial regions obtained by dividing a feature quantity space of the first feature quantity, and classifies the population documents into a second specific number (two or more, namely three, for instance) of second partial regions obtained by dividing a range of the second feature quantity.

Figure 2:
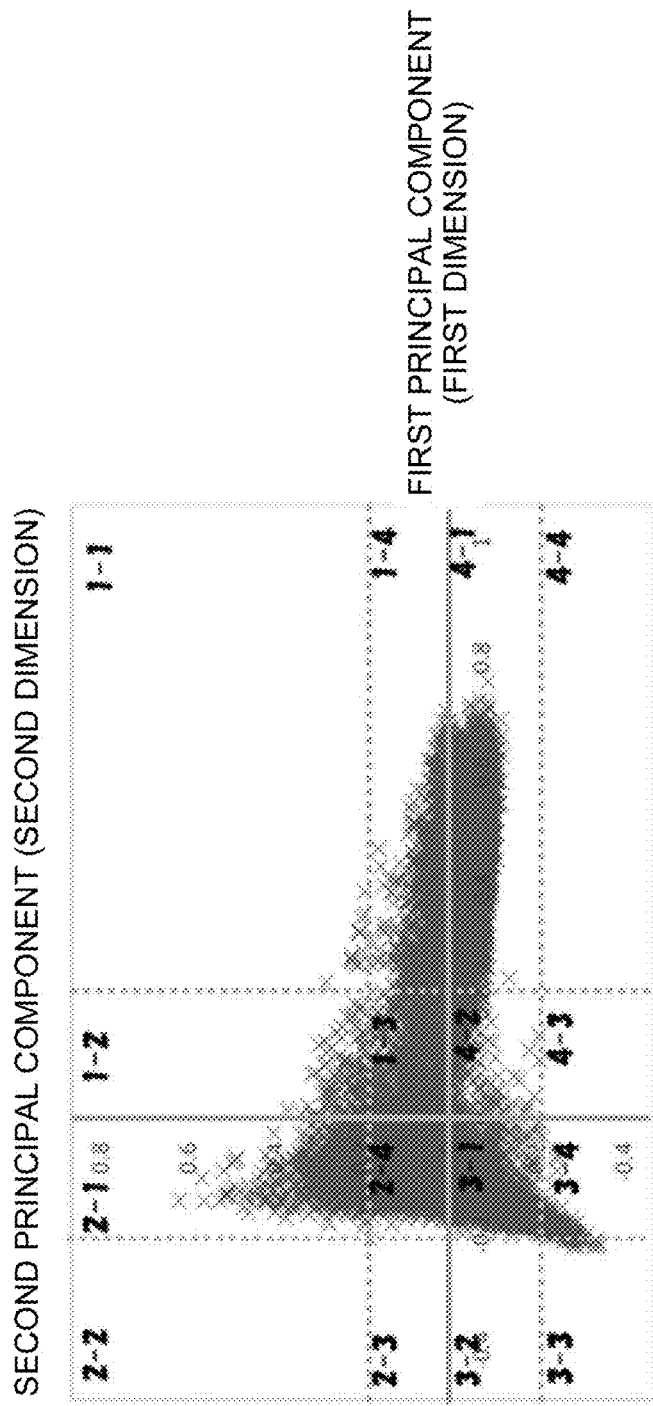
FIG. 2 is a diagram illustrating an example of first partial regions obtained by dividing a feature quantity space of a first feature quantity (first and second principal components)

FIG. 2 is a diagram illustrating an example of the first partial regions obtained by dividing the feature quantity space of the first feature quantity (first and second principal components). In the example illustrated in FIG. 2, a positive boundary value, zero, and a negative boundary value are set for the first principal component and for the second principal component as well. Of a two-dimensional feature quantity space, a first quadrant is divided into four first partial regions #1-1 through #1-4, a second quadrant is divided into four first partial regions #2-1 through #2-4, a third quadrant is divided into four first partial regions #3-1 through #3-4, and a fourth quadrant is divided into four first partial regions #4-1 through #4-4. Consequently, in the example illustrated in FIG. 2, the feature quantity space of the first feature quantity is divided into 16 first partial regions.

The range (of 0 to 1) of the cosine similarity as the second feature quantity is divided into three second partial regions. Based on the mean value $\mu$ and the standard deviation $\sigma$ of the cosine similarity of the population documents, the three second partial regions are assumed as a range where the cosine similarity is less than $(\mu-\sigma)$, a range where the cosine similarity is equal to or more than $(\mu-\sigma)$ but less than $(\mu+\sigma)$, and a range where the cosine similarity is not less than $(\mu+\sigma)$, respectively.

The training data extraction unit 46 (a) selects, for each combination of a first partial region and a second partial region, one or more (three, for instance) population documents classified in both of the first partial region and the second partial region and (b) sets population documents selected with respect to all combinations of the first partial regions and the second partial regions as training data.

If the feature quantity space is divided into 16 first partial regions as in the example illustrated in FIG. 2, the range is divided into three second partial regions, and three documents are selected for each combination, 144 (=16×3×3) population documents are extracted as training data.

The training data determination unit 47 performs, for each population document of the training data, annotation to indicate whether the relevant document is a desired document. As a result of the annotation, a flag indicating whether the relevant document is the desired document is stored in the storage 2 or the like and read by downstream processing units as required.

Specifically, the training data determination unit 47 allows the user to determine, for each document extracted by the training data extraction unit 46 as training data, whether the relevant document is the desired document, so as to acquire the result of determination by the user (that the relevant document is the desired document or that the relevant document is a non-desired document). For instance, the training data determination unit 47 displays, on the display device 4, a list of the documents extracted by the training data extraction unit 46 as training data and specifies, for each document on the list, whether the relevant document is a desired document for the user, based on the user operation detected through the input device 3, so as to acquire the result of determination by the user. If the training data determination unit 47 is to be used, a similarity score (1 or 0, for instance) corresponding to the document under determination is set as a value corresponding to the result of the determination.

The training data balance control unit 48 performs a balancing process after the annotation and, in the balancing process, thins out the documents in the training data so that the ratio between the number of desired documents among the documents of the training data and the number of non-desired documents among the documents of the training data may meet a specific condition.

As an example, if the ratio (>1) between the number of desired documents and the number of non-desired documents is equal to or higher than a specific threshold (1.3, for instance), the desired documents or non-desired documents in the training data are thinned out so that at least one document may remain for every combination as above, so as to make such ratio lower than the specific threshold.

The machine learning processing unit 32 uses the training data (namely, the documents as extracted and combined with similarity scores given to the documents in the annotation) (after the balancing process) to implement machine learning of the similarity score calculation unit 33.

The similarity score calculation unit 33 is a processing unit capable of machine learning (such as a classifier), and calculates similarity scores of the documents of the training data (after the balancing process).

This processing unit is a support-vector machine (SVM), a naive Bayes classifier, a random forest learner or a convolutional neural network, for instance, and the machine learning processing unit 32 employs a machine learning method corresponding to the type of this processing unit so as to implement the machine learning using the training data or the like.

The retrieval condition input unit 22 specifies the retrieval expression based on the user operation detected by using the input device 3 and the display device 4 as a user interface, and designates the specified retrieval expression toward the training data collection system 31.

The retrieval result display unit 23 acquires the similarity scores calculated by the similarity score calculation unit 33, sorts the documents, which are extracted as the training data, in descending order of the similarity scores, and displays a combination of the documents with the similarity scores of the documents on the display device 4 as, for instance, a list prepared in accordance with the descending order of the similarity scores.

In the present embodiment, the retrieval result display unit 23 further (a) detects, through the input device 3, a user operation indicating whether a document displayed on the display device 4 is a desired document and (b) derives, based on the user operation about a specific number of most recent documents displayed, a desired document occurrence rate (running mean for a specific number of most recent documents, for instance) representing a ratio of desired documents and displays the desired document occurrence rate on the display device 4. The desired document occurrence rate decreases as the displayed documents increase, so that the user is able to refer to a current desired document occurrence rate so as to terminate the display of the result of retrieval (if the desired document occurrence rate has decreased to 1%, for instance).

Next, operations of the systems as above are described.

Initially, the retrieval condition input unit 22 specifies, based on a user operation, a retrieval expression desired by a user and designates the retrieval expression toward the training data collection system 31. In the training data collection system 31, the document acquisition unit 41 acquires population documents based on the retrieval expression designated by the user.

Then, the morpheme analysis unit 42 extracts a morpheme of the retrieval expression and a morpheme of each population document. The vector generation unit 43 derives a feature vector of the retrieval expression as a reference feature vector, and derives a feature vector of each population document as a document feature vector.

The feature quantity extraction unit 44 (a) performs a dimensionality reduction process to reduce dimensionality of the reference feature vector and the document feature vector and sets a dimensional value obtained by the dimensionality reduction process performed on the reference feature vector and the document feature vector as a first feature quantity and (b) derives a cosine similarity between the reference feature vector and the document feature vector as a second feature quantity.

The grid division unit 45 classifies the population documents into first partial regions obtained by dividing a feature quantity space of the first feature quantity, and classifies the population documents into second partial regions obtained by dividing a range of the second feature quantity. The training data extraction unit 46 (a) selects, for each combination of a first partial region and a second partial region, at least one population document classified in both of the first partial region and the second partial region and (b) sets population documents selected with respect to all combinations of the first partial regions and the second partial regions as training data.

The training data determination unit 47 performs, for each population document of the training data, annotation to indicate whether the relevant document is a desired document.

The training data balance control unit 48 performs a balancing process after the annotation and, in the balancing process, thins out the documents in the training data so that the ratio between the number of desired documents among the documents of the training data and the number of non-desired documents among the documents of the training data may meet a specific condition.

In this way, the training data, which is widely distributed in the feature quantity space of the first feature quantity and the range of the second feature quantity, is generated.

The machine learning processing unit 32 uses such training data to implement machine learning of the similarity score calculation unit 33. After the machine learning, the similarity score calculation unit 33 calculates a similarity score of each document of the training data extracted by the training data extraction unit 46.

Similarity scores indicating to what degree the respective documents in the population conform with the retrieval expression are thus calculated.

The retrieval result display unit 23 acquires the calculated similarity scores, sorts the documents, which are extracted as training data, in descending order of the similarity scores, and displays the sorted documents on the display device 4.

According to the embodiment as described above, the vector generation unit 43 derives a feature vector of a retrieval expression as a reference feature vector, and derives a feature vector of a document belonging to a population as a document feature vector. The feature quantity extraction unit 44 (a) performs a dimensionality reduction process to reduce dimensionality of the reference feature vector and the document feature vector and sets a dimensional value obtained by the dimensionality reduction process performed on the reference feature vector and the document feature vector as a first feature quantity and (b) derives a cosine similarity between the reference feature vector and the document feature vector as a second feature quantity. The grid division unit 45 classifies documents into a first specific number of first partial regions obtained by dividing a feature quantity space of the first feature quantity, and classifies the documents into a second specific number of second partial regions obtained by dividing a range of the second feature quantity. The training data extraction unit 46 (a) selects, for each combination of a first partial region and a second partial region, at least one document classified in both of the first partial region and the second partial region and (b) sets documents selected with respect to all combinations as training data.

Therefore, the training data, which entirely includes, with good balance, wide-ranging documents out of the documents constituting the population, is automatically collected, and related documents entirely included as wide-ranging documents out of the documents constituting the population are presented in an appropriate order as the result of retrieval.

Figure 3:
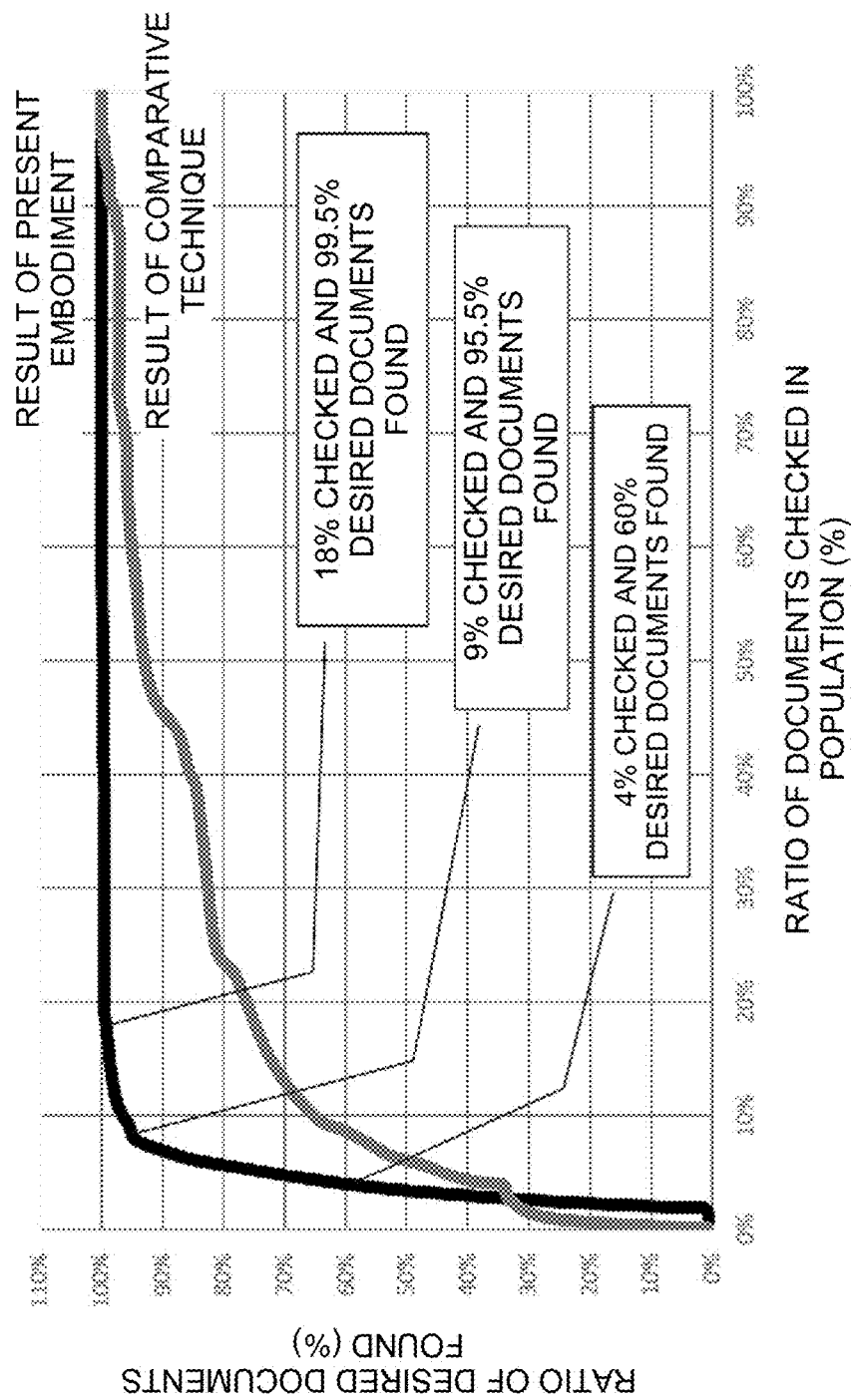
FIG. 3 is a diagram for explaining a result of document retrieval by the embodiment.

FIG. 3 is a diagram for explaining a result of document retrieval by the present embodiment. As seen from the verification illustrated in FIG. 3, in the document retrieval by the present embodiment, most of desired documents have been found in a population (35 thousand documents) in an early phase as compared with an existing method.

It is evident to a person skilled in the art that the embodiment as described above can be subjected to various modifications and corrections. Such modifications and corrections may be made without departing from the gist and scope of the subject matter of the present disclosure and without reducing intended advantages. In other words, such modifications and corrections are intended to be incorporated in the claims.

For instance, the document retrieval program 2a in the above embodiment may be stored in a computer readable recording medium and installed from the recording medium into the storage 2.

The present disclosure is applicable to document retrieval, for instance.

What is claimed is:

1. A training data collection system, having at least one processor in communication with a memory to execute computer instructions comprising:
    a vector generation unit that derives a feature vector of a retrieval expression as a reference feature vector, and derives a feature vector of each of documents belonging to a population as a document feature vector;
    a feature quantity extraction unit that (a) performs a dimensionality reduction process to reduce dimensionality of the reference feature vector and the document feature vector and sets a dimensional value obtained by the dimensionality reduction process performed on the reference feature vector and the document feature vector as a first feature quantity and (b) derives a cosine similarity between the reference feature vector and the document feature vector as a second feature quantity;
    a grid division unit that classifies the documents into a first specific number of first partial regions obtained by dividing a feature quantity space of the first feature quantity, and classifies the documents into a second specific number of second partial regions obtained by dividing a range of the second feature quantity; and
    a training data extraction unit that (a) selects, for each combination of a first partial region and a second partial region, at least one document classified in both of the first partial region and the second partial region and (b) sets documents selected with respect to all combinations as training data.

2. The training data collection system according to claim 1, the computer instructions further comprising a training data determination unit that performs, for each of the documents of the training data, annotation to indicate whether the relevant document is a desired document.

3. The training data collection system according to claim 2, the computer instructions further comprising a training data balance control unit that thins out the documents of the training data so as to cause a ratio between a number of the documents, which are each the desired document, and a number of the documents, none of which is the desired document, to meet a specific condition.

4. A similarity score calculation system, having at least one processor in communication with a memory to execute computer instructions comprising:
    the training data collection system according to claim 1;
    a similarity score calculation unit that calculates similarity scores of the documents of the training data; and
    a machine learning processing unit that uses the training data to implement machine learning of the similarity score calculation unit.

5. A document retrieval system, having at least one processor in communication with a memory to execute computer instructions comprising:
    the similarity score calculation system according to claim 4;
    a retrieval condition input unit that designates the retrieval expression; and
    a retrieval result display unit that sorts the documents, which are extracted as the training data, in descending order of the similarity scores and displays a combination of the documents with the similarity scores of the documents on a display device.

6. The document retrieval system according to claim 5, wherein the retrieval result display unit (a) detects, through an input device, a user operation indicating whether a document displayed on the display device is a desired document and (b) derives, based on the user operation about a specific number of most recent documents displayed, a desired document occurrence rate representing a ratio of the desired documents and displays the desired document occurrence rate on the display device.

7. A non-transitory computer readable recording medium storing a training data collection program that causes a computer to serve as:
    a vector generation unit that derives a feature vector of a retrieval expression as a reference feature vector, and derives a feature vector of each of documents belonging to a population as a document feature vector;

a feature quantity extraction unit that (a) performs a dimensionality reduction process to reduce dimensionality of the reference feature vector and the document feature vector and sets a dimensional value obtained by the dimensionality reduction process performed on the reference feature vector and the document feature vector as a first feature quantity and (b) derives a cosine similarity between the reference feature vector and the document feature vector as a second feature quantity;

a grid division unit that classifies the documents into a first specific number of first partial regions obtained by dividing a feature quantity space of the first feature quantity, and classifies the documents into a second specific number of second partial regions obtained by dividing a range of the second feature quantity; and a training data extraction unit that (a) selects, for each combination of a first partial region and a second partial region, at least one document classified in both of the first partial region and the second partial region and (b) sets documents selected with respect to all combinations as training data.

* * * * *